United States Patent [19]

Shiraishi et al.

[11] 3,932,574
[45] Jan. 13, 1976

[54] PROCESS FOR PREPARING FIBROUS POLYVINYL ALCOHOL

[75] Inventors: Makoto Shiraishi; Sigetaka Iwata; Masao Oura, all of Toyama, Japan

[73] Assignee: Kuraray Co., Ltd., Kurashiki, Japan

[22] Filed: July 11, 1973

[21] Appl. No.: 378,213

[30] Foreign Application Priority Data
July 11, 1972  Japan................................. 47-69790

[52] U.S. Cl.............. 264/147; 264/185; 264/210 R; 264/DIG. 47
[51] Int. Cl.²........................ D01F 6/14; B29H 7/18
[58] Field of Search ............ 264/147, 210 F, 210 R, 264/185, 209, DIG. 47

[56] References Cited
UNITED STATES PATENTS

| | | | |
|---|---|---|---|
| 3,135,813 | 6/1964 | Speakman............................ | 264/147 |
| 3,264,384 | 8/1966 | Settele................................ | 264/209 |
| 3,562,369 | 2/1971 | Chopra et al.................... | 264/210 R |
| 3,608,042 | 9/1971 | Rasmussen....................... | 264/210 R |
| 3,641,760 | 2/1972 | Keuchel............................... | 264/147 |
| 3,645,085 | 2/1972 | Rassart............................... | 264/210 R |
| 3,847,845 | 11/1974 | Tada et al............................ | 264/185 |

FOREIGN PATENTS OR APPLICATIONS 35-15014  10/1960  Japan................................. 264/185

*Primary Examiner*—Jay H. Woo
*Attorney, Agent, or Firm*—Bacon & Thomas

[57] ABSTRACT

Shaped articles of polyvinyl alcohol are prepared by saponifying a liquid feed of polyvinyl ester as it cascades downwardly along the walls of a cylindrical reactor, and by taking-up from the reactor outlet the fibrous, shaped article of oriented, solid polyvinyl alcohol thus formed at a rate of at least 50 cm/minute. Advantageously, the thus formed shaped article is next divided into sliver, stretched and cut into fibers and, optionally, beaten, which fibers are useful in the manufacture of paper-like sheet materials.

23 Claims, 7 Drawing Figures

PROCESS FOR PREPARING FIBROUS POLYVINYL ALCOHOL

BACKGROUND OF THE INVENTION

1. Field of the Invention

The present invention relates to a process for the shaping of filamentary structures of polyvinyl alcohol (hereinafter "PVA"), and, more especially, relates to a process for the shaping of filamentary structures of PVA useful in the manufacture of certain synthetic paper products.

2. Description of the Prior Art

The art is of course replete with various methods for the shaping of various filamentary and fibrous structures from both the natural and the synthetic resins. Such processes include both the normal wet, dry and melt spinning, as well as other methods such as fibrillating stretched film, monofilament extrusion, bi-constituent monofilament extrusion, and the like. For example, in Japanese Pat. No. 9651/1960 there is disclosed a process wherein a mixed melt of at least two normally solid and incompatible thermoplastic resins (e.g., polystyrene and polyethylene) are extruded through the slit in a film-forming die to form a film which is next stretched and then cut into a plurality of filaments which are rectangular in cross-section. The resultant filaments are subsequently further cut into fibers which are then beaten mechanically as in a normal papermaking operation to fibrillize the cut (to lengths of about 0.3 to 2.5 cm) fibers. The resultant fibers and fibrillized fibers are each composed of the mixed resin composition, and are useful in the manufacture of the synthetic papers.

See also Japanese Pat. No. 5212/1964 wherein a mixed melt of like resins (e.g., powdered vinylidene chloride and low pressure polyethylene) is extruded as a monofilament, cooled and solidified, stretched, and beaten with a wooden hammer (without cutting the drawn filament), either as is or after being woven into a suitable fabric. Alternatively, the stretched fibers can be beaten after combing the same with an iron comb, crushed between conventional cylinders and then cracked into short fibers; or, in another embodiment, drawn and beaten by rubbing the fibers on the edge of a square, stainless steel bar.

The thus-obtained fibers have a length of several tens of millimeters and can also be fabricated into paperlike sheets, especially when screened in admixture with ordinary paper pulp. And in Japanese Pat. No. 6215/1966 a process is disclosed for extruding or spinning continuously a shaped filamentary structure of crystalline synthetic polymer comprising a three-dimensional integral plexus, by extruding a certain thermoplastic composition (e.g., a mixture of linear polyethylene and methylene chloride) through a suitable orifice under relatively high pressure and temperature into a zone of lower pressure.

However, these aforesaid methods of the prior art are not satisfactory for economical mass production because the resins employed are either highly incompatible with water or are relatively insoluble therein, and, in addition, in the performance of such methods complicated machinery and/or other highly sophisticated apparatus are required. Moreover, since the very hydrophilic cellulosics need not be employed in such processes, the synthetic papers fabricated from such thermoplastics do not necessarily exhibit those properties necessary in a desirable synthetic paper or similar sheetlike material.

It is of course well known that polyvinyl alcohol can be formed into fibers and filaments, but the most extensively used process to accomplish the above aims is quite complicated and involves the spinning of an aqueous solution of PVA, or solution of PVA in other suitable inert solvent. And such preparation of fibers and filaments of PVA depends essentially upon various physical changes that take place during the process.

SUMMARY OF THE INVENTION

Accordingly, a primary object of the invention is to provide an improved method for the preparation of fibrous PVA.

Another object of the invention is to provide a method for the preparation of PVA fibers directly from a polyvinyl ester, e.g., polyvinyl acetate, without the necessity for employing conventional various spinning operations.

Still another object of this invention is to provide a process for the preparation of PVA fibers which has for its essence a chemical change taking place within the polymer molecule.

Yet another object of the invention is to provide a novel process for the preparation of PVA fibers which depends upon the saponification of a polyvinyl ester to the desired PVA.

Other objects of the invention will become more apparent from the description which follows.

DETAILED DESCRIPTION OF THE INVENTION

Figure 3:
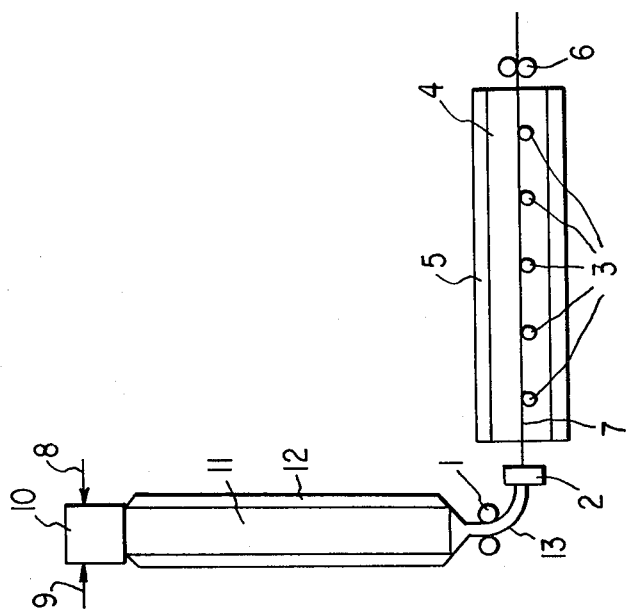
FIG. 3 is a cross-sectional view of the reactor of FIG. 1 in combination with certain saponified PVA treating means according to the invention.

From Japanese Pat. No. 15014/1960 it is known that polyvinyl ester, e.g., polyvinyl acetate can be saponified to polyvinyl alcohol in a hollow, cylindrical reactor. However, the fibrous PVA cannot be simply obtained by merely supplying a mixture of the ester and an alkali catalyst to the upper portion or inlet end of a hollow cylinder under suitable conditions of saponification, and thence simply saponifying, precipitating within the cylinder, and taking-up the coagulated PVA from the reactor outlet.

It has now been discovered that a rod or bar of PVA can be made fibrous and oriented in the direction of take-up by adjusting the rate of such take-up from the cylindrical reactor outlet at the bottom end of the reactor, to a value of at least 50 cm/min., and that fibrous PVA can easily be prepared by stretching this PVA bar while it is still "wet" and with simultaneous drying thereof, and subsequently beating the drawn filamentary structure.

Although the mechanism of the saponification of the ester to the alcohol within the hollow, cylindrical reactor is not clear, it is thought that a solution of PVA and suitable alcohol, in admixture with an alkali catalyst, promotes saponification as the reaction mixture descends or cascades downwardly through the reactor; gelatinization occurs upon the reaction mixture reaching a certain degree of saponification whereby the PVA is precipitated. Thus, there appears to be a phase inversion of from liquid phase to solid phase at this point.

It is also thought that the reason why fibrous PVA can be obtained by simple adjustment of the rate of take-up to 50 cm/min. is that the PVA is more highly oriented at the point of coagulation. This is documented by the facts that the fineness, strength, and molecular orientation as determined by X-ray analysis, are greatly improved upon increasing the take-up speed of the PVA.

Also according to this invention, the saponifiable polyvinyl ester is supplied to the upper, inlet end of the reactor in alcoholic solution, and the concentration of the polyvinyl ester in the alcoholic solution thereof is preferably greater than about 20% by weight; most preferably this concentration is in the range of from about 20 to about 40% by weight. When the concentration of the ester is less than 20% by weight, the PVA which precipitates is oriented to a certain degree but is nonetheless unsatisfactory as an end product and certain disadvantages are encountered in preparing the apparatus for producing such an unsatisfactory product. On the other hand, when the concentration of the ester exceeds 40% by weight, severe problems will be encountered within the apparatus because of the high viscosity of the reaction mixture and the resultant PVA precipitate moreover loses its orientation and a highly fragile product will result. The degree of polymerization of the polyvinyl ester charged to the reactor is most advantageously in the range of from about 1,000 to 3,000 in view of the excellent fiber-forming properties of such a polymer. It has similarly been determined that when the reaction temperature exceeds about 55°C., bubbles appear during the reaction and are accordingly incorporated into the PVA precipitate which then becomes undesirably fragile. A preferred temperature range within the apparatus is between about 35° to 55°C. The mole ratio of the catalyst used for the saponification reaction (e.g., a typical alkali catalyst) to the polyvinyl ester charged is between about 0.01 and 0.10, depending upon the concentration of the ester in solution and the temperature for saponification. The catalyst is used in the form of an alcoholic solution comprising about 50 to 200 grams of catalyst per one liter of alcohol. Further according to the invention, the resultant PVA precipitate is taken-up while adjusting the rate of take-up from the saponification reactor outlet. Suitable reaction apparatus comprises a saponification reactor disposed directly below a mixer wherein the feed materials are mixed (see the figures of drawing). The inner walls of the hollow cylinder are preferably smooth and are most advantageously fabricated from a substance which is neither adhesive to the polyvinyl ester nor the products produced during the course of the saponification reaction. As heretofore mentioned, the rate of take-up is not less than 50 cm/min., and preferably is between about 50 and 1,500 cm/min., albeit this rate is somewhat dependent upon the reaction rate, the amount of feed materials supplied and the length of the hollow, cylindrical reactor. When the rate of take-up is below 50 cm/min., none of the desired PVA in fibrous form is obtained. When the rate of take-up is more rapid, certain physical properties of the precipitate such as orientation are improved, but the state of precipitation is unstable, whereby it is necessary to carefully dimension the reactor and monitor the conditions for the saponification reaction. Thus, the diameter of the hollow, cylindrical reactor has been determined to preferably fall within the range of 10 to 300 mm, with a length of between 4,000 and 30,000 mm.

Saponification of the polyvinyl ester in the alcoholic solution according to the invention is conducted continuously in the cylindrical reactor wherein the feed materials comprising the catalyst solution are first mixed in a suitable blending apparatus. In another embodiment of the invention, it has, moreover, also been found that the desired fibrous PVA is obtained if there is additionally employed as feed an alcoholic solution of partially saponified polyvinyl ester, having a molar percent of degree of saponification of between 10 and 45, as an accelerator for the fibrillization of the PVA, and in an amount between 20 and 75% by weight based on the solution of the polyvinyl ester which comprises the basic component of the feed. The reaction product is still taken-up at a speed of at least 50 cm/min. from the reactor outlet.

While the reason for the accelerated fibrillization to an enhanced degree when using the partially saponified polyvinyl ester has not been established, it is considered that in the reaction medium the existence of the two types of polymers having different degrees of reaction, in solution, may afford the enhanced results, very much similar to the coexistence of various polymers.

In the saponification of the polyvinyl ester in methanol, especially polyvinyl acetate in methanol, and though the solution is a clear paste in the range 0 to 45 molar percent degree of saponification, same coagulates to a gel when the concentration is greater than about 45 to 50 molar percent.

The degree of saponification of the partially saponified polyvinyl ester accelerator in the alcohol ranges between 10 and 45 molar percent, preferably between about 15 and 40 molar percent. When this degree of saponification is less than 15 molar percent and especially when it is less than 10 molar percent, it is exceedingly difficult to enhance fibrillization. Contrariwise, when the degree of saponification exceeds 40 molar percent, especially if it exceeds 45 molar percent, the original reaction medium becomes unstable. The partially saponified polyvinyl ester in alcoholic solution can be conveniently prepared by the partial hydrolysis of the polyvinyl ester at a lower temperature, utilizing a lesser amount of catalyst, and then neutralizing same with an amount of acetic acid under sufficient stirring when the desired degree of saponification has been attained.

The proportion in the reaction mix of the partially saponified polyvinyl ester, in alcoholic solution, to that of the polyvinyl ester is in the range of from about 20 to about 75 weight percent, preferably between about 25 and 70% by weight. It is difficult to obtain a fibrillized fibrous material according to the invention when this proportion is less than 25 weight percent, especially if it is less than 20% by weight and greater than 70% by weight, more especially if it is greater than 75% by weight.

With respect to the reaction temperature, when same is greater than about 55°C. bubbling occurs in the reaction mixture and the bubbles remain in the reaction product and in the ultimate fibrous PVA. Thus-obtained PVA is accordingly brittle. Preferably, then, the reaction is conducted at temperatures between about 35°C. and 55°C. depending somewhat upon the specific apparatus utilized. Further concerning the various processing parameters, the molar ratio of the catalyst, advantageously an alkali catalyst, too depends upon the concentration of the polyvinyl ester; and, upon ultimate stretching of the PVA intermediate, it has been found necessary that such stretching must first be performed under wet conditions.

More specifically, the PVA bar which exits the saponification reactor is still wet to a certain degree, subsequent to the saponification, by reason of drainage (containing volatile components, methanol and/or methyl acetate), but it is still necessary to further wet the fibrous PVA to the extent of at least 25% by weight of volatiles while concomitantly stretching and drying the same in air. In this case the solvent can be recovered at any point in time. Thus, the PVA bar is wet with either a non- or poor solvent for the PVA to a certain prescribed wet state prior to the stretching operation. To accomplish this goal, a small amount of water or appropriate aqueous vapor may be added to the fibrous PVA, e.g., by the spraying thereof or by partial pressure (humidity).

In the wet-stretching step heretofore described, the degree of saponification increases even further due to the effect of the methanol vapors and the high temperatures, whereby an almost completely saponified product is obtained. Resistance to water is even more improved during the stretching operation.

In this initial stretching operation, the relative difficulty of this step is greatly influenced by how much the fiber is wet at the time of stretching. When the volatiles content is small, the stretching becomes difficult.

The temperature required for the stretching operation is in the range of 50° to 200°C. In this case, the content of volatiles in the PVA is necessarily above 25%, preferably between 25 and 85%. When this content falls below 25%, the precipitated PVA is fibrous but really too fragile to be effectively stretched and it is easily cut.

Contrariwise, when the stretching is effected at a temperature below 50°C. the effect thereof is deleterious and the stretching cannot be advantageously performed. When the temperature is above 200°C. for the stretching, the product dries too fast and the volatiles content rapidly decreases below 25% before the stretching operation is even completed, whereby cutting and rupturing or otherwise severing of the product readily occurs.

The rate of amount of wet-stretching is easily determined vis-a-vis the volatiles content therebefore, taking into consideration the temperature parameter, and the product is advantageously wet-stretched at least two times, preferably 3 to 10 fold.

The wet-stretched shaped filamentary structure is next treated at high temperatures followed by dry-stretching of same in order to increase the strength thereof by reasons of its then improved degree of orientation and crystallinity of the PVA. In the dry-stretching at elevated temperatures, the fibrous PVA is found to contain less than about 10% by weight volatiles, preferably less than about 5%. Said dry-stretching is conducted at temperatures in the range of from 100° to 220°C., preferably from 150° to 210°C. And since the fibrous PVA, subsequent to the saponification, contains an amount of sodium acetate, it is preferred that the postsaponified, fibrous PVA, after either the wet- or dry-stretching thereof, be washed with an acidic, aqueous solution (e.g., an aqueous solution of sulfuric acid) to leach away the sodium acetate content of the fibrous PVA. According to the invention fibrous PVA can be obtained displaying at least 0.5 g/denier, particularly from 0.7 to 3.5 g/denier of stretch strength, and being about 1 to 50 denier (from 10 to 500 microns).

The stretched, shaped filamentary structures according to the invention are cut into any suitable length, advantageously 1 to 50 mm and preferably 2 to 20 mm, and are beaten with a conventional beating apparatus to provide fine, fibrillized fibers similar to the conventional wood pulp fibers and these can be used either alone or in combination with other synthetics or with the natural wooden pulps to prepare synthetic or semi-synthetic paper-like sheets on a conventional paper-making machine. The papers obtained according to this invention are of high quality type.

In one embodiment of this invention, as illustrated by the figures of drawing, an alcoholic solution of a polyvinyl ester, e.g., a methanolic solution of polyvinyl acetate, is fed to the reactor 11 at inlet 8 and the saponification catalyst is introduced at the point 9, both into the mixer 10. This mixture is then blended uniformly and cascades into the saponification reactor 11 which is disposed below the mixer 10. After the saponification step has been completed a rod or bar 13 of PVA exits the reactor outlet with the take-up being controlled by the rollers 1 downstream of the reactor outlet, with the rate of take-up being controlled to at least 50 cm/min. The saponification reactor 11 is jacketed, jacket shown as 12. The rod 13 of fibrous PVA which exits the reactor 11 is passed through a divider 2 wherein the said rod or bar is divided into a plurality of slivers each about 6 mm square. About 15 of such slivers are provided, with each bundle comprising about 40 to 50 filaments per sliver (see FIG. 6). Next, the filamentary PVA 7 is conveyed to the stretching apparatus 4 wherein it is stretched while being passed over the guide rollers 3 and is taken-up by the rollers 6. The PVA does not stick to the rollers 3.

As the stretching in the apparatus 4 is first effected in the wet state, such apparatus is provided with those jackets 5 for temperature regulation and sufficient attachment for providing and recovering the liquid which is impinged upon the filamentary material 7. The take-up speed of the rollers 6 is of course correlated with the speed of the take-up rollers 1 and is adopted to be easily changed. Generally, the take-up or draw rollers 6 comprise 2 to 4 rolls so that no slippage occurs during the drawing operation and the surfaces thereof are tailored for a non-slip operation.

Also according to the invention, the unsaponified feed stock which is in admixture and coexists with the saponified solids in the early stages of the saponification gradually is saponified in the reactor 11, and becomes fibrous and is oriented as it cascades through the said reactor, ultimately being taken up as a single bar 13 of PVA at the reactor outlet whereat the saponification is essentially complete.

The PVA bar thus produced and drained after saponification is continuously taken-up by the rollers 1, as shown, although means other than the said rollers 1 can be employed. In any event, the stay time in the reactor is regulated by changing the rate of take-up whereby fibrous PVA having varying degrees of orientation can be obtained. And since the feed solutions or continuous solid phase descend through the reactor along the inner walls thereof, it is desirable that said walls be of a plain and smooth substance having an affinity for the reaction materials, such as polyethylene, polypropylene, polyvinyl chloride or Teflon to inhibit sticking of the various products of reaction and feed materials thereto.

While the hollow reactor utilized in this invention is advantageously cylindrical in shape, it of course can take other shapes such as ellipsoidal, fluted, irregular, or the like, especially any of the aforesaid cross-sections which would provide an increased surface area of reaction. The reactor is most preferably longitudinal in the direction of its major axis.

The most preferred polyvinyl ester which can be utilized as the feed stock in the present invention is polyvinyl acetate, albeit other esters too can be employed. Exemplary of the alcoholic reaction medium are the lower aliphatic alcohols, for example, methanol. Exemplary saponification catalysts are the alkali metal hydroxides, e.g., sodium hydroxide.

In order to further illustrate the present invention and the advantages thereof, the following specific examples are given, it being understood that same are intended merely as illustrative and in no wise limitative.

EXAMPLE 1

Figure 6:
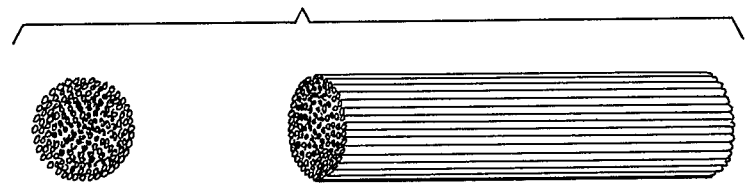
FIG. 6 is a cross-sectional view and a plan view of the flattened PVA rod after it has been divided into sliver by the divider 2.

Fibrous PVA as illustrated in FIG. 6 was obtained by using the apparatus shown in FIG. 3 under the following conditions:
Saponification Step:
Polypropylene pipe, inner diameter, 27 mm; length of the pipe, 4,000 mm; temperature of the jacket, 50°C., concentration of polyvinyl acetate in methanolic solution of polyvinyl acetate, 22.5% (water content, 0.1% in solution); degree of polymerization, 1,780; solution of the caustic soda catalyst, in methanol; concentration of the caustic soda in the alkaline methanolic solution, 100 g/l (methanol); alkali mol ratio to polyvinyl acetate, 0.045; amount of methanolic solution of polyvinyl acetate feed, 30 l/hr;rate of take-up from reactor outlet, 100 cm/minute.

Figure 4:
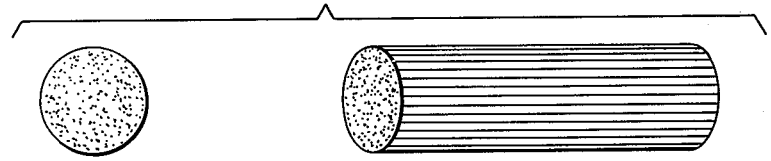
FIG. 4 is a cross-sectional view and a plan view of the PVA rod as it exits the reactor of FIG. 1.
Figure 5:
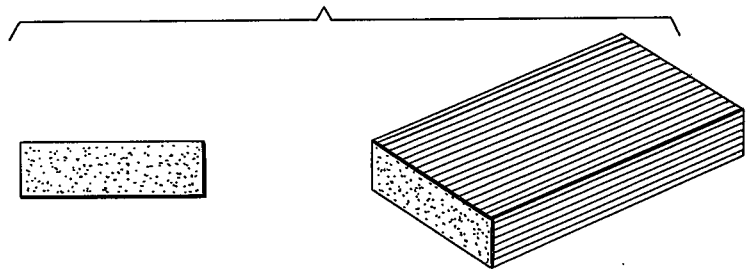
FIG. 5 is a cross-sectional view and a plan view of the PVA rod after it has been flattened by the rollers 1.

PVA bar obtained under the aforesaid conditions of saponification having the configuration of FIG. 4, was flattened into the configuration of FIG. 5 by the rollers 1, was divided into 15 slivers in the divider 2, each sliver comprising about 40 to 50 filaments and being about 6 mm square, and was then stretched in the apparatus 4 under the following conditions:
Wet-Stretching Conditions:
Initial volatile portion (methanol) of the fibrous PVA, 63%; temperature within stretching apparatus 4, 97°C; drafting magnitude, 6.6 fold; drafting velocity, 3 cm/minute.
Dry-Stretching Conditions:
Volatiles (methanol) in the fibrous PVA is 5% by weight; temperature for dry stretch, 160°C; total drafting magnitude, 8.6 fold; drafting velocity, 3.5 cm/minute; strength of resultant fibrous substance, 1.4 g/denier; fineness, 65 micron; saponification degree 99.5 mol %.

EXAMPLE 2

Fibrous PVA (FIG. 6) was obtained by repeating Example 1 except that the following conditions were employed:
Saponification Step:
Concentration of polyvinyl acetate in the methanolic solution of polyvinyl acetate, 27.4%; mole ratio of alkali to polyvinyl acetate, 0.055; feed amount of the methanolic solution of polyvinyl acetate, 40 l/hour; velocity of take-up, 122 cm/minute.
Wet-Stretching Conditions:
Initial volatile portion (methanol) of fibrous PVA, 71%; inner temperature within stretching apparatus, 135°C; drafting magnitude, 6.0 fold; drafting velocity, 4 cm/minute.
Dry-Stretching Conditions:
Volatiles (methanol) of the fibrous PVA is 5% by weight; temperature for dry-stretching, 160°C; total drafting magnitude, 14 fold; drafting velocity, 5 cm/minute; strength of resultant fibrous substance, 2.5 g/denier; fineness, 45 micron; saponification degree, 99.5 mol %.

EXAMPLE 3

Fibrous PVA (FIG. 6) was obtained under the following conditions utilizing the apparatus shown in FIG. 3:
Saponification Step:
Diameter of the polypropylene pipe, 42 mm; length of pipe, 11.000 mm; temperature of the jacket, 50°C; concentration of polyvinyl acetate in the methanolic solution of polyvinyl acetate, 25.8%; concentration of caustic soda in the alkaline methanolic solution, 70 g/l (methanol); mole ratio of the alkali to polyvinyl acetate, 0.04; feed amount of the methanolic solution of polyvinyl acetate, 180 l/minute; velocity of take-up, 240 cm/minute.
Wet-Stretching Conditions:
Initial volatile portion (methanol) of the fibrous PVA, 48%; temperature within stretching apparatus 4, 70°C; drafting magnitude, 6.0 fold.
Dry-Stretching Conditions:
Volatiles (methanol) of the fibrous PVA is 4% by weight; temperature within stretching apparatus, 200°C; total drafting magnitude, 12.0 fold.

The obtained fibrous substance had the following physical properties: strength, 3.1 g/denier; fineness, 52 micron; degree of saponification, 99.9 mol %; water resistance, 100°C.

EXAMPLE 4

Figure 1:
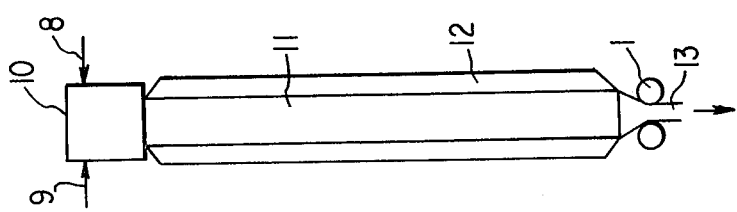
FIG. 1 is a cross-sectional view of a reactor utilized in the saponification according to the invention.

At the commencement of the process, the lower end of a pipe reactor 11 shown in FIG. 1 was closed until the separation of saponified product began, and then, upon opening the outlet, the saponified product in rod-like shape corresponding to the internal dimensions of the pipe 11 was extruded. This rod was nipped between two rollers 1 which were set just beneath the reactor outlet, and was continuously taken-up. The feed to the reactor was continuous and the speed of the rollers was adjusted so as to correspond to the feed input.

The conditions were as follows:
Inner diameter and length of the pipe (reactor) 11 were 27 mm and 4000 mm respectively, pipe fabricated from polypropylene, and jacket 12 temperature was 50°C. The content of polyvinyl acetate in a methanolic solution (content of water in the solution: 0.1%) was 22.5 weight percent, where the degree of polymerization of the polymer was 1780. The alkali solution used as a catalyst for saponification was composed of methanol and caustic soda, the concentration of caustic soda was 100 g/l (methanol), the molar ratio of alkali was 0.05. Feed rate of the methanolic solution of the polyvinyl acetate was 30 liters per hour and the take-up speed of the rollers was 100 cm per minute.

The product thus obtained was fibrous and highly oriented. After stretching and following thermal treatment, a yarn-like substance, with a strength of 1.6 g/denier and a diameter of 52 micron, was obtained. The degree of saponification of the fibrous substance (FIG. 6) was 99.7 molar percent.

EXAMPLE 5

The saponification process was carried out as in Example 4. Conditions were as follows: 42 Inner diameter and length of the pipe 11 were 42 mm and 1,000 mm, respectively, pipe constructed of polypropylene, and jacket 12 temperature was 50°C. The concentration of polyvinyl acetate in methanolic solution was 25.2 weight percent (the water content in the solution was 0.1%). The degree of polymerization of the polymer was 810. The alkali solution fed was composed of methanol and caustic soda, the concentration of caustic soda was 93 g/l (methanol), and molar ratio of alkali was 0.050. Feed rate of the methanolic solution of polyvinyl acetate was 210 liters per hour and take-up speed of rollers was 280 cm per minute.

The product thus obtained was fibrous and more oriented than that of the Example 4. After stretching and following thermal treatment, the fibrous substance displayed a strength of 3.1 g/denier; fiber diameter was 25 micron, and degree of saponification was 99.6 molar percent.

COMPARATIVE EXAMPLE

The saponification process of Example 4 was repeated. Conditions utilized were:

Inner diameter and length of the pipe 11 were 45 mm and 3,000 mm respectively, pipe constructed of polypropylene, and jacket 12 temperature was 45°C. The concentration of polyvinyl acetate in methanolic solution was 29 weight percent. The alkali solution, composed of methanol and caustic soda, the concentration of caustic soda was 84 g/l (methanol) was used in a molar ratio of 0.03. Feed rate of the methanolic solution was 30 liters per hour and take-up speed of rollers was 33.2 cm per minute.

The product thus obtained was too dense for practical uses and was scarcely oriented. The degree of saponification of the separated PVA was 99.7 molar percent.

EXAMPLE 6

The saponification reaction was carried out as in Example 4. Conditions were as follows:

A stainless steel pipe 11, 30 mm in inner diameter and 4,000 mm in length, provided with an inner film of polypropylene, 0.05 mm thickness, was used as a reactor and the jacket 12 temperature was 50°C. The concentration of polyvinyl acetate in methanolic solution was 27.0 weight percent. The alkali solution was composed of methanol and caustic soda, the concentration of caustic soda was 15.8 g/l (methanol), and molar ratio of alkali was 0.035. Feed rate of the methanol solution of polyvinyl acetate was 50 liters per hour and take-up speed of rollers was 122 cm per minute.

The strength of the fibrous PVA thus obtained was 1.88 g/denier, and the diameter thereof was 48 micron and the degree of saponification thereof was 99.8 mol %.

EXAMPLE 7

Figure 2:
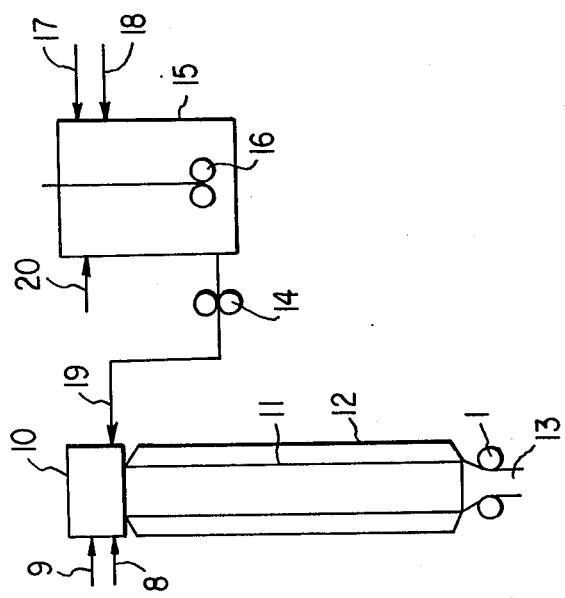
FIG. 2 is a cross-sectional view of the reactor of FIG. 1 in combination with certain feed material treating means.

Employing the apparatus shown in FIG. 2, a fibrous PVA was obtained under the following conditions:
Conditions for preparation of paste of partially saponified polyvinyl acetate methanolic solution as an accelerator for fiberization of PVA:

A polyvinyl acetate methanolic solution was added from inlet 20 to mixer 15 wherein, the content of polyvinyl acetate in the methanolic solution of polyvinyl acetate was 30 weight percent (water content in the solution was 0.07 weight percent), the caustic alkali solution contained 10 g of NaOH per liter of methanol and was added from inlet 17 to the mixer 15, the reaction temperature was 27°C, and the molar ratio of caustic alkali to polyvinyl acetate was 0.004.

The alkali solution was mixed with a paste of polyvinyl acetate in mixer 15 having an agitator 16, and held at the given temperatute until a saponification reaction was carried out for forty minutes after addition of the caustic soda, and then stopped by adding acetic acid from inlet 18 to mixer 15 in an amount equivalent to the caustic soda used. The degree of saponification of the obtained paste of polyvinyl acetate was 35 molar percent.

Conditions for saponification:

A methanolic solution of polyvinyl acetate (degree of polymerization, 1,780; concentration of polyvinyl acetate in solution, 27.5 weight %; water content in the solution, 0.1 weight %) was fed at a rate of 30 liters per hour, together with a methanolic solution of caustic soda (concentration, 15 g/l; molar ratio of alkali, 0.035) and the paste of the above prepared partially saponified vinyl acetate in the methanolic solution, in the same amounts by weight as the solution of polyvinyl acetate, via inlets 8, 9 and 19 and were mixed together in a mixer 10, and then introduced to a reactor 11 (inner diameter of pipe, 27 mm; fabricated from polypropylene; length of pipe, 4,000 mm; temperature of jacket 12, 50°C) and the reaction product was taken-up at the reactor outlet at a speed of 90.5 cm/min. The degree of saponification was 99.6 mol %.

The product thus obtained of the separated PVA was highly oriented and fibrous. After stretching and thermal treatment, a yarn-like sliver comprised of the filaments of FIG. 6, which had a strength of 2.5 g/denier and which was 34 microns in diameter, was obtained.

EXAMPLE 8

A methanolic solution of polyvinyl acetate (degree of polymerization of polyvinyl acetate, 1,820; concentration, 27.8 weight %; water content in the solution, 0.1 %) was fed at a rate of 320 liters per hour, together with caustic soda in methanolic solution for the saponification (concentration of caustic soda, 24 g/l; molar ratio of alkali, 0.07) and a paste of partially saponified polyvinyl acetate in the methanolic solution (obtained as in the Example 7) in the same amounts (by weight) as the methanolic solution of polyvinyl acetate, to the mixer 10. The mixture was introduced to a reactor 11 (inner diameter of pipe, 42 mm; pipe fabricated from propylene; length of pipe, 11,000 mm; temperature of jacket 12, 50°C) from its inlet end, and the product was taken-up at a speed of 430 cm/min. The degree of saponification was 99.9 molar percent.

The product thus obtained of separated PVA was more highly oriented and fiberized than that of the Example 1. After stretching and thermal treatment, a yarnlike sliver comprised of the filaments of FIG. 6, which was 3.0 g/denier in strength and 21 microns in diameter, was obtained.

Figure 7:
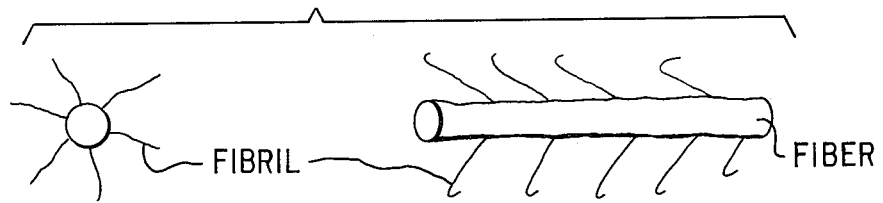
FIG. 7 is a cross-sectional view and a plan view of a stretched, cut and beaten, fibrillized PVA fiber according to the invention.

The resultant products of the aforesaid Examples 1 to 8 can all be cut to any suitable length, e.g., fiber or staple fiber length, and can be formed into paper-like sheet materials utilizing conventional papermaking techniques. These cut fibers can also be beaten in a beater typically used in the papermaking industry to fibrillize same to the configuration illustrated in FIG. 7. The fibrillized fibers too can be formed into paper-like sheet materials utilizing conventional papermaking techniques. In the manufacture of the paper-like sheet materials, the fibers and fibrillized fibers can either be screened alone or in combination with other synthetic or natural paper pulps.

While the invention has been described and illustrated with reference to certain preferred embodiments thereof, those skilled in the art will appreciate that various modifications, changes, omissions and substitutions can be made without departing from the spirit of the invention. It is intended, therefore, that the invention be limited only by the scope of the following claims.

What is claimed is:

1. A process for the preparation of shaped articles of polyvinyl alcohol, comprising saponifying a liquid feed of a polyvinyl ester as same downwardly cascades through a horizontal hollow cylindrical reactor, and thence taking-up from the reactor outlet the fibrous, shaped article of oriented, solid polyvinyl alcohol thus formed at a rate of from 50 to 1,500 cm/minute in the form of a continuous bar, wetting said bar with a non- or poor solvent for polyvinyl alcohol until same contains at least 25% by weight of volatile components and wet-stretching said bar at a temperature of from 50° to 200°C. whereby said bar is transformed into fibrous polyvinyl alcohol.

2. The process as defined by claim 1, wherein the liquid feed of polyvinyl ester comprises an alcoholic solution of polyvinyl acetate and a saponification catalyst.

3. The process as defined by claim 2, wherein the alcoholic solution is a methanolic solution and the catalyst is an alkali catalyst.

4. The process as defined by claim 3, wherein the concentration of polyvinyl acetate in the methanolic solution is greater than about 20% by weight.

5. The process as defined by claim 4, wherein the concentration is between about 20 and 40% by weight.

6. The process as defined by claim 4, wherein the degree of polymerization of the polyvinyl acetate ranges between about 1,000 and 3,000.

7. The process as defined by claim 4, wherein the saponification is effected at a temperature in the range of between about 35° and 55°C.

8. The process as defined by claim 4, wherein the mole ratio of catalyst to polyvinyl acetate ranges from between about 0.01 and 0.10.

9. The process as defined by claim 4, wherein the catalyst is present in an amount of between about 50 and 200 grams per liter of methanol.

10. The process as defined by claim 4, wherein the reactor has an internal diameter of between about 10 and 300 mm, and a length of between about 4,000 and 30,000 mm.

11. The process as defined by claim 4, wherein the feed further comprises an alcoholic solution of partially saponified polyvinyl ester having a molar percent of degree of saponification of between about 10 and 45.

12. The process as defined by claim 11, wherein the partially saponified polyvinyl ester is present in an amount from between about 20 and 75% by weight of the unsaponified polyvinyl acetate feed solution.

13. The process as defined by claim 4, further comprising dividing the shaped article of oriented, solid polyvinyl alcohol into sliver.

14. The process as defined by claim 13, further comprising stretching the filaments which comprise the sliver.

15. The process as defined by claim 14, wherein the filaments are both wet- and dry-stretched.

16. The process as defined by claim 15, wherein the filaments contain at least 25% volatiles during the wet-stretching.

17. The process as defined by claim 16, wherein the wet-stretching is effected at a temperature in the range of between about 50° and 200°C., and the filaments are drawn at least twofold.

18. The process as defined by claim 17, wherein the filaments are wet to a volatiles content of between about 25 and 85% by weight, and the wet-stretching is from three- to tenfold.

19. The process as defined by claim 18, wherein the filaments are further dried and stretched at a temperature in the range of between about 100° and 220°C.

20. The process as defined by claim 19, wherein the volatiles content of the filaments during dry-stretching is less than 10% by weight.

21. The process as defined by claim 20, further comprising washing the filaments with an aqueous, acidic solution.

22. The process as defined by claim 20, wherein the resultant, stretched filaments are cut into fibers.

23. The process as defined by claim 22, wherein the cut fibers are between about 1 and 50 mm in length.

* * * * *